United States Patent [19]
Viertel et al.

[11] Patent Number: 5,442,530
[45] Date of Patent: Aug. 15, 1995

[54] MIRROR WITH ILLUMINATING DEVICE, IN PARTICULAR FOR MOTOR VEHICLES

[75] Inventors: Lothar Viertel, Altforweiler, Germany; Patrick Welter, La Chambre, France

[73] Assignee: Gebr. Happich GmbH, Germany

[21] Appl. No.: 280,492

[22] Filed: Jul. 26, 1994

[30] Foreign Application Priority Data

Aug. 4, 1993 [DE] Germany .................. 43 26 102.7

[51] Int. Cl.6 ........................................... F21V 33/00
[52] U.S. Cl. ..................... 362/137; 362/74; 296/97.5; 315/84
[58] Field of Search ............ 296/97.5, 97.9, 214; 315/77, 84; 362/74, 80.1, 135–137, 140–144, 155, 276, 394, 801

[56] References Cited

FOREIGN PATENT DOCUMENTS

| 0462087 | of 1991 | European Pat. Off. . |
| 1954091 | of 1967 | Germany . |
| 1972170 | of 1967 | Germany . |
| 2631712 | of 1977 | Germany . |
| 2924529 | of 1981 | Germany . |
| 3332191 | of 1985 | Germany . |
| 3338279 | of 1985 | Germany . |
| 4035553 | of 1991 | Germany . |

*Primary Examiner*—James C. Yeung
*Assistant Examiner*—Alan B. Cariaso
*Attorney, Agent, or Firm*—Ostrolenk, Faber, Gerb & Soffen

[57] ABSTRACT

A mirror (14) borne by a cover (34) and an illuminating device (8, 11) are arranged in a shallow housing (1). When mirror (14) is in its position of non-use, cover (34) extends parallel to the main wall of the housing (1). Cover (34) has a U-shaped recess extending from a longitudinal edge to provide clearance for passage of diffusion screen (8) and light rays projecting therethrough. Screen (8) is developed in the shape of a quarter circle corresponding to the dimensions of the recess. The edge region of cover (34) having the recess is articulated to the housing (1). In the bottom of the housing (1) is mounting opening (31) for the individual parts of the illuminating device, and housing (1) is provided with an electric circuit and switch (6). The latter is operable between a first position to turn the light off, a second position to turn the light on or off via a contact in the door of a vehicle wherein housing (1) is mounted, and a third position to turn the light on or off by swinging movement of the cover (34).

20 Claims, 3 Drawing Sheets

MIRROR WITH ILLUMINATING DEVICE, IN PARTICULAR FOR MOTOR VEHICLES

BACKGROUND OF THE INVENTION

The present invention relates to a mirror having an illuminating device, and more particularly relates to a mirror of this type for motor vehicles.

Mirrors of this type with illuminating devices are known to the prior art. Typical constructions often include an approximately rectangular trough-like housing within which there is an illuminating device which comprises at least one electric light source and a diffusion screen covering the light source. The mirror is mounted on a pivoted cover which can be swung out of the housing. Traditional prior art embodiments are of relatively complicated construction and, as a rule, are too large to be installed conveniently in a sun-visor body or in the ceiling of a motor vehicle.

SUMMARY OF THE INVENTION

The primary object of the present invention is to provide a novel mirror and illuminating device of the aforementioned type which, while being comparatively simple and inexpensive to manufacture, is characterized by being relatively shallow to simplify installation and expand possible uses thereof.

In order to achieve this object it is proposed that when the mirror is in its position of non-use, the cover be in a plane generally parallel to the bottom of the housing. The housing cover has a U-shaped recess that provides clearance for the dispersion screen of the illuminating device, the recess is along a longitudinal edge of the cover, and the screen is developed in the form of a quarter circle corresponding to the dimension of the recess. The cover is articulated to the housing at its edge region having the recess. In the bottom of the housing a mounting opening is provided for the individual parts of the illuminating device and the housing is equipped with an electric circuit and a switch which has three switch positions. In the first switch position, the light of the illuminating device is deenergized, in the second switch position the light is turned on and off via a contact in the door of the vehicle, and in the third switch position the light turns on and off automatically as the cover bearing the mirror swings from its open to its closed position.

The source of light is not obstructed by the cover when it is closed to place the mirror in its position of non-use. Because of this, a considerable reduction in structural height is obtained as compared with traditional constructions. This is very important since the present trend is toward making sun visors thinner and toward reducing space between the ceiling and metal roof of the vehicle. As a source of light, at least one tubular bulb is employed. By its nature a tubular bulb requires only a shallow space.

A particular important advantage of the instant invention is the extremely small structural height of the mirror/illuminating device.

Another advantage of the instant invention is that the housing is smooth at its rear, does not have protruding regions at its front, and the housing can be provided at the front and rear with the parts of the illuminating device, all of which simplifies installation. The construction for pivoting of the cover on the illumination side of the housing is also simplified, since the same means can be used for the arrangement of the parts of the illuminating device and for the arrangement of the cover mounting parts. The mirror can be used by swinging the cover upward, either with or without illumination, depending only on the position of the switch. Illumination, depending on the position of the switch, can be disconnected entirely or be used for lighting the interior of the vehicle or as illumination for using the mirror in the dark. The provision of traditional vehicle interior lights can, accordingly, be dispensed with.

BRIEF DESCRIPTION OF THE DRAWINGS

Other features and advantages of the present invention will become apparent from studying the following description of the invention which refers to the accompanying drawings in which.

DETAILED DESCRIPTION OF THE DRAWINGS

Figure 4:
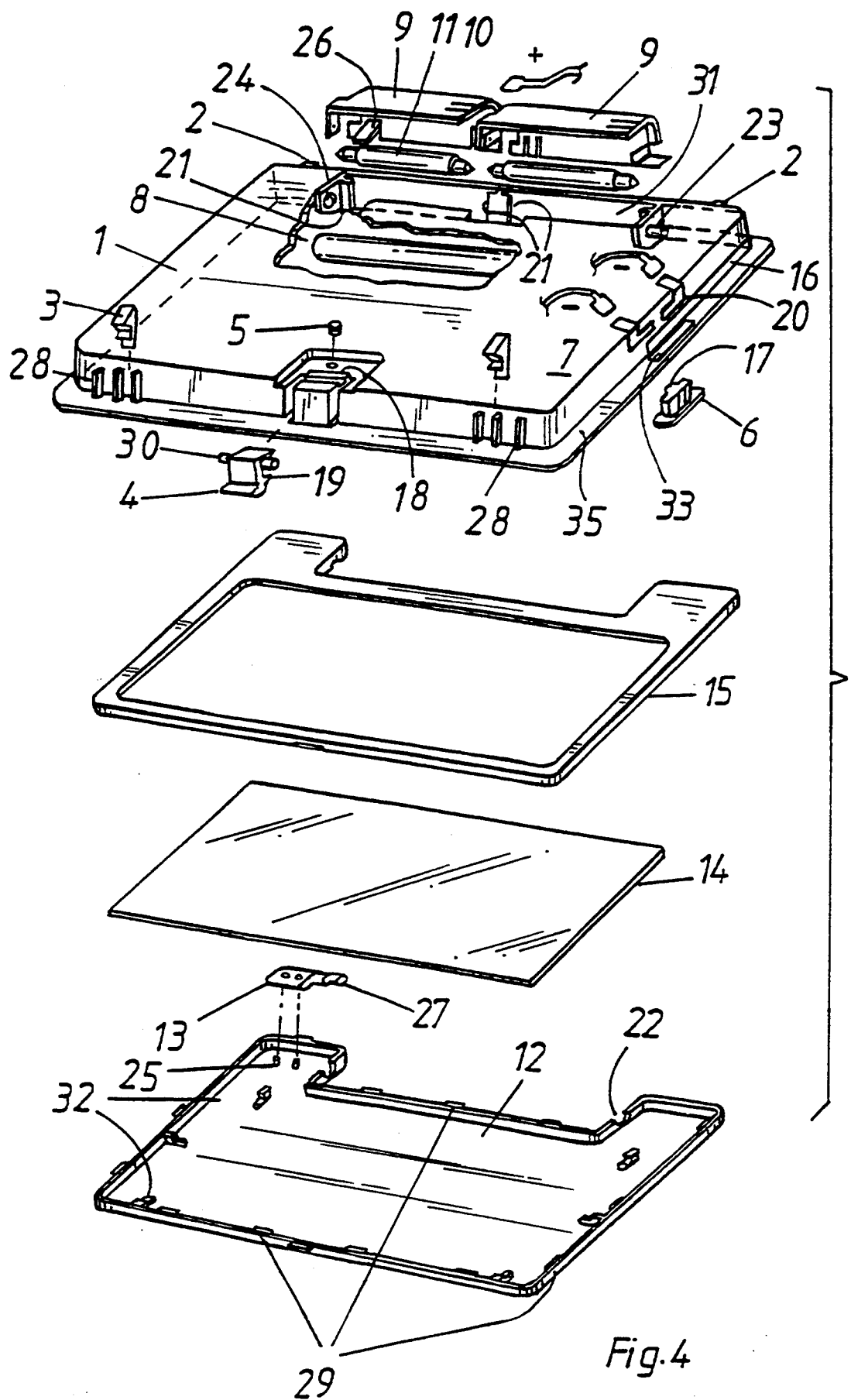
FIG. 4 is an exploded perspective of the individual parts comprising the assembly of FIG. 1.

With particular reference to FIG. 4, it is the construction of the mirror/illuminating device embodying the instant invention includes essentially a shallow approximately rectangular trough-shaped housing 1 with mounting hooks 2 developed on a longitudinal wall of the housing 1. A locking device 4 (open/closed) with mounting pins 30 and undercut 19 developed thereon, is biased closed by compression spring 5. A slide switch 6, including contact plate 17, contact band 16, contact plate 7 and contact plate 20, is disposed along a transverse edge of housing 1. Diffusion screen 8 and two identical reflectors 9 with recesses developed thereon for sources of light in the form of tubular bulbs 11 (for instance 12 V, 3 W), as well as insertion tongues 10 for cable connections. Cover 34 comprising lower or outer part 12, upper or inner part 15 as a mirror mask, and mirror 14 disposed between parts 12 and 15, is pivotally mounted to housing 1 along its longitudinal edge remote from locking device 4. The central portion at the hinged side of cover 34 is provided with a recess or notch so that when cover 34 is closed (FIG. 2) it provides clearance for screen 8 and will not block light being emitted by bulbs 11.

Figure 1:
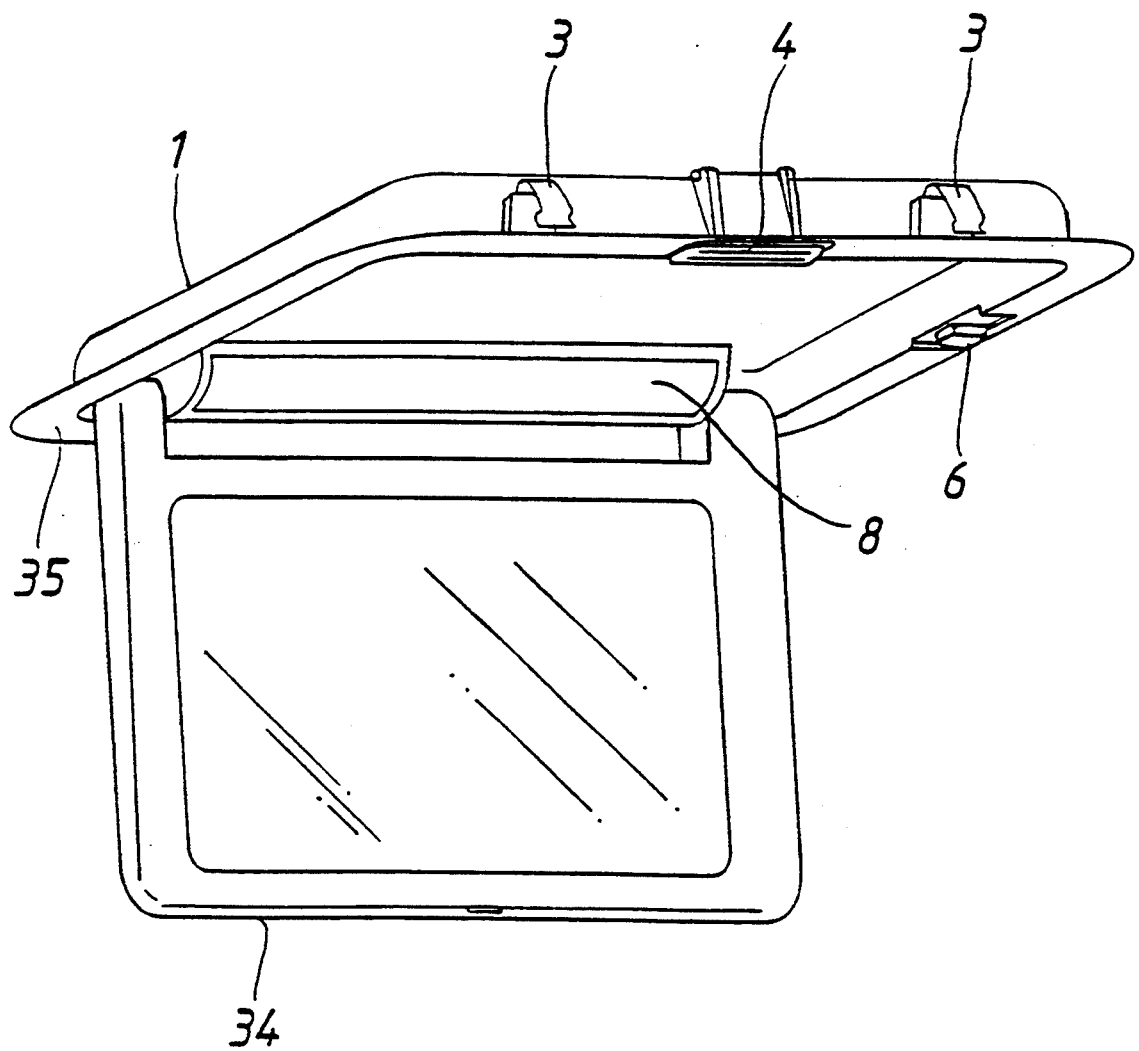
FIG. 1 is a perspective of a complete assembly of a mirror with illuminating device constructed in accordance with teachings of the instant invention.
Figure 2:
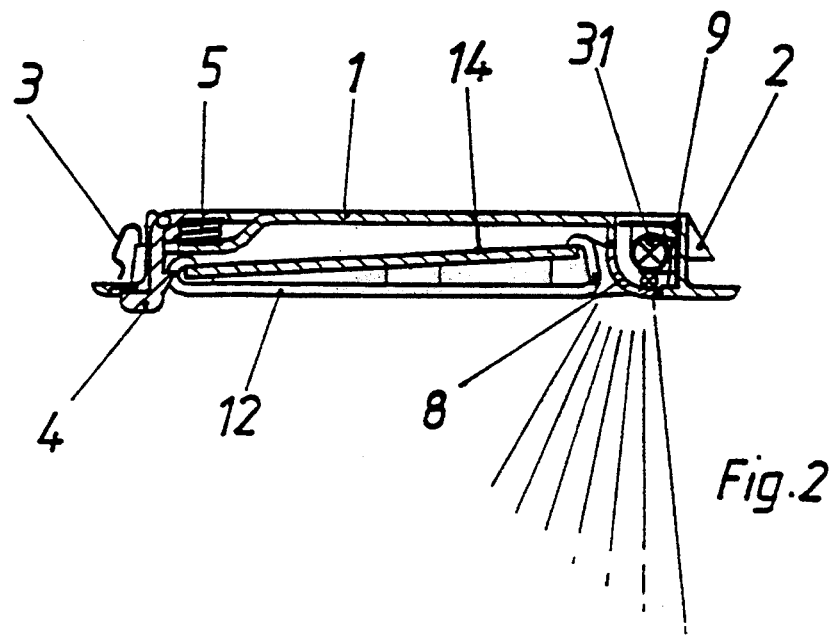
FIG. 2 is a transverse section through the assembly of FIG. 1, with the mirror thereof swung inward to its position of storage or non-use.

Housing 1, on the longitudinal wall thereof opposite hooks 2, is provided with the two mounting springs 3. Locking device 4 is mounted to housing 1 in mounting formations 18 which are developed on housing 1 for this purpose. Compression spring 5 causes undercut 19 at the hook portion of locking device 4 to be located in closed position for holding cover 34 closed (FIG. 2). Electrical contact plates 7 and 20 as well as contact band 16 are mounted on the outside of the housing 1 with contact plate 20 serving as ground. Contact plate 7 is used as a door contact, and contact band 16 serves as a bridge between the contact plates 7 and 20 as well as reflectors 9. The latter serves as a bulb holder. Slide switch 6 is provided with a contact plate 17 and is mounted by insertion into receiving slot 33 provided for this purpose in flange 35 of housing 1, and can be moved along slot 33 to the desired switch position as required.

Two identical reflectors 9, each with cable connections and bulb receiving tongues 10 (terminals) thereon are inserted from the open rear side of housing trough 1 through mounting opening 31 into the receiving pockets 21 developed for this purpose, and are all clamped in position. Tubular bulbs 11 are then inserted into the receiving tongues 10 of reflectors 9 and then clamped in position. In this phase of the mounting, the illuminating function can be tested at minimum expense in the event of possible malfunction. Thereupon, the cover of the source of light, shaped as a quarter of a circle and in the form of a dispersion screen 8, is clipped into receiving formations provided for it on the housing 1.

The completely preassembled housing 1 is brought into a vertical position in order to bring lower part 12 of the cover 34 into position horizontally within the housing 1 (position greater than 90°). Semicircular recess 22 in the lower part 12 is brought towards the mounting pin 23 developed on the housing 1 and inserted. In this mounting position of the lower part 12, mounting pin 13 having the eccentric pin attachment 27 is introduced into the hole 24 in the housing 1 and simultaneously pressed onto the insertion pins 25 on lower part 12.

Figure 3:
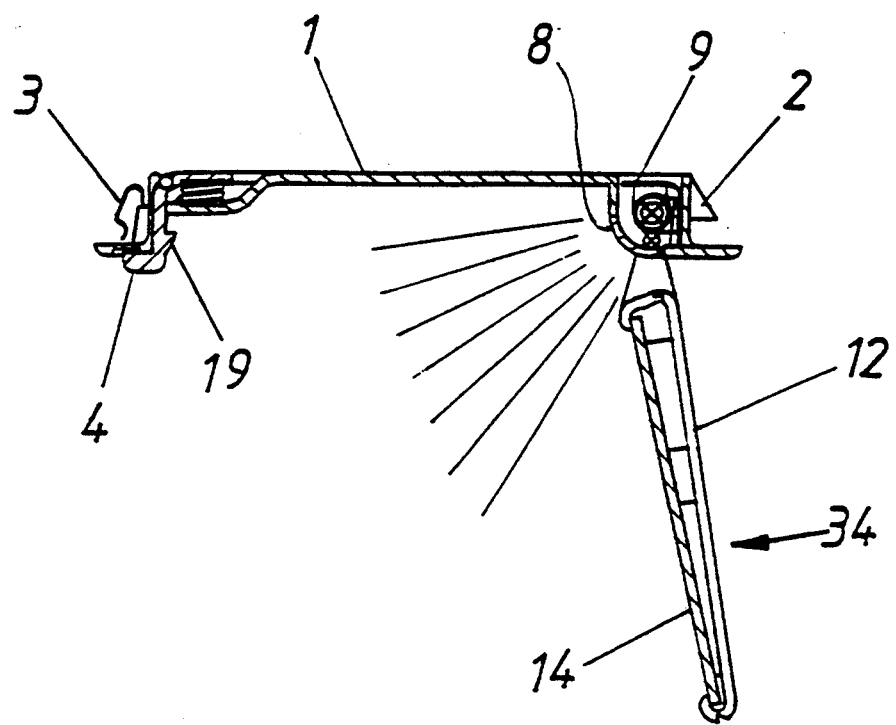
FIG. 3 is a transverse section through the assembly of FIG. 1, with the mirror thereof swung out to its position for use.

In a >90° position of the cover 34 with respect to housing 1 (FIG. 3), a braking moment is produced since in this position of cover 1 eccentric 27 of mounting pin 13 wipes and presses against spring tongue 26 formed on reflector 9. Mirror 14 is inserted into the lower part 12 and is positioned by resting and spacer pieces 32 developed on lower part 12 for positioning mirror 14. Upper part 15 is placed flush on the lower part 12 and mirror 14, and is secured in this position by applying ultrasonic energy to fusible parts 29 on lower part 12. Thereupon, mirror 14 is fastened in rattle-free manner.

The mirror with illuminating device as described is suitable particularly for installation in sun visors and ceilings of motor vehicles.

Although the present invention has been described in relation to a particular embodiment thereof, many other variations and modifications and other uses will become apparent to those skilled in the art. It is preferred, therefore, that the present invention be limited not by the specific disclosure herein, but by the appended claims.

What is claimed is:

1. Illuminated mirror apparatus adapted particularly for motor vehicles, said apparatus including:

a generally rectangular shallow trough-like housing (1) having a main rear wall;

a cover (34) including a mirror (14), said cover being pivotally mounted to said housing (1) along an edge thereof for movement between a closed and an open position, in said closed position said cover (14) being forward of said rear wall and generally parallel thereto with said mirror (14) concealed, and in said open position said mirror (14) being outside of said housing (1) and being accessible for use;

an illuminating device mounted to said housing (1) and including a source of electric light (11) and a dispersion screen (8);

said cover (34) having a recess that provides clearance for said dispersion screen (8) when said cover (34) is in said closed position;

said housing (1) being equipped with an electric circuit (7, 16, 20,) and a switch (6) connected in said circuit, said switch (6) being operable to first, second and third positions;

said switch (6) when operated to said first position turning said light (11) off, said switch when in said second position enabling said light (11) to be turned on and off responsive to closing and opening of a vehicle door, and said switch (6) when in said third position enabling said light to be turned on and off by pivoting said cover (34) to said open and closed positions.

2. Apparatus according to claim 1, in which the screen (8) is formed as a quarter circle and is of a shape corresponding to said recess in said cover (34).

3. Apparatus according to claim 1, in which the cover (34) includes a lower part (12) and an upper part (15), said recess being in both said lower and upper parts (12, 15) and said upper part having a window opening with which the mirror (14) is aligned; and said recess being defined partially by spaced boundary walls wherein there are mounting openings (22) to receive mounting pins (13, 23) on said housing (1) which form a pivot axis for the cover (34) on the housing (1).

4. Apparatus according to claim 3, in which a first of the mounting pins (13) for the cover (34) has an eccentric pin attachment (27) which is in resting engagement with a spring tongue (26) on said housing (1).

5. Apparatus according to claim 4 also including a spring-loaded locking device (4) for holding the cover (34) in said closed position, said locking device (4) being located on said housing (1) along a side thereof remote from said illuminating device (8, 11).

6. Apparatus according to claim 5, in which the housing (1), along a free edge thereof, is provided with a surrounding flange (35) which is parallel to the rear wall; and the housing (1), on a longitudinal wall thereof, is provided with outwardly protruding mounting hooks (2) and, on its opposite longitudinal wall, is provided with outwardly protruding mounting springs (3).

7. Apparatus according to claim 6 in which the flange (35) is provided with a receiving slot (33) within which the switch (6) is movable between said first, second and third positions.

8. Apparatus according to claim 7, also including a reflector (9) for the electric light (11), an opening (31) in said housing (1) for mounting said reflector (9), said housing(1) also being provided with holding straps (21) for retaining portions of the illuminating device and mounting straps for articulation of the cover (34) on the housing (1) in the vicinity of the mounting opening (31).

9. Apparatus according to claim 8, in which the housing (1) and the cover (34) are formed as plastic injection moldings.

10. Apparatus according to claim 1, that is proportioned and constructed to be operatively mounted in a mounting opening developed in a ceiling as well as in a sun visor of a motor vehicle.

11. Apparatus according to claim 1, in which a first of the mounting pins (13) for the cover (34) has an eccentric pin attachment (27) which is in resting engagement with a spring tongue (26) on said housing (1).

12. Apparatus according to claim 1 also including a spring-loaded locking device (4) for holding the cover (34) in said closed position, said locking device (4) being located on said housing (1) along a side thereof remote from said illuminating device (8, 11).

13. Apparatus according to claim 12, in which the cover (34) includes a lower part (12) and an upper part (15), said recess being in both said lower and upper parts (12, 15) and said upper part having a window opening with which the mirror (14) is aligned; and said recess being defined partially by spaced boundary walls wherein there are mounting openings (22) to receive mounting pins (13, 23) on said housing (1) which form a pivot axis for the cover (34) on the housing (1).

14. Apparatus according to claim 1, in which the housing (1), along a free edge thereof, is provided with a surrounding flange (35) which is parallel to the rear wall; and the housing (1), on a longitudinal wall thereof, is provided with outwardly protruding mounting hooks (2) and, on its opposite longitudinal wall, is provided with outwardly protruding mounting springs (3).

15. Apparatus according to claim 14, in which a first of the mounting pins (13) for the cover (34) has an eccentric pin attachment (27) which is in resting engagement with a spring tongue (26) on said housing (1).

16. Apparatus according to claim 8, in which the housing (1) and the cover (34) are developed as plastic injection moldings.

17. Apparatus according to claim 9, that is proportioned and constructed to be operatively mounted in a mounting opening developed in a ceiling as well as in a sun visor of a motor vehicle.

18. Apparatus according to claim 6, that is proportioned and constructed to be operatively mounted in a mounting opening developed in a ceiling as well as in a sun visor of a motor vehicle.

19. Apparatus according to claim 18 also including a spring-loaded locking device (4) for holding the cover (34) in said closed position, said locking device (4) being located on said housing (1) along a side thereof remote from said illuminating device (8, 11).

20. Apparatus according to claim 19, in which a first of the mounting pins (13) for the cover (34) has an eccentric pin attachment (27) which is in resting engagement with a spring tongue (26) on said housing (1).

* * * * *